United States Patent
Georg et al.

(10) Patent No.: US 6,541,697 B1
(45) Date of Patent: Apr. 1, 2003

(54) PHOTOVOLTAICALLY SELF-CHARGING STORAGE SYSTEM

(75) Inventors: Andreas Georg, Freiburg (DE); Anneke Hauch, Freiburg (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/979,097

(22) PCT Filed: May 15, 2000

(86) PCT No.: PCT/DE00/01554

§ 371 (c)(1),
(2), (4) Date: Nov. 19, 2001

(87) PCT Pub. No.: WO00/72340

PCT Pub. Date: Nov. 30, 2000

(30) Foreign Application Priority Data

May 19, 1999 (DE) ......................................... 199 23 112

(51) Int. Cl.$^7$ ................................................ H01G 9/20
(52) U.S. Cl. ........................ 136/263; 136/256; 136/291; 136/252; 429/111; 257/43; 257/40; 257/431
(58) Field of Search .......................... 429/111; 136/263, 136/256, 291, 252; 257/43, 40, 431

(56) References Cited

U.S. PATENT DOCUMENTS

| 3,879,228 A | | 4/1975 | Theodorou et al. |
| 4,119,768 A | * | 10/1978 | Bayard ........................ 429/111 |
| 5,346,785 A | * | 9/1994 | Akuto et al. ................ 429/111 |
| 5,441,827 A | * | 8/1995 | Gratzel et al. ............... 429/111 |

FOREIGN PATENT DOCUMENTS

| DE | 2924079 A1 | 12/1980 |
| DE | 3618881 C2 | 7/1989 |
| DE | 19816675 A1 | 10/1999 |
| EP | 0887817 A | 12/1998 |
| FR | 2469788 | 5/1981 |
| WO | 91/16719 A2 | 10/1991 |
| WO | WO-91/16719 A2 * | 10/1991 |
| WO | WO-99/53372 A1 * | 10/1999 |

OTHER PUBLICATIONS

Sviridov et al. "Spectral Sensitization of tungsten trioxide by two dyes separated by a polymer film", STN Chemical Abstract, XP002108473 (1986).

(List continued on next page.)

*Primary Examiner*—Alan Diamond
(74) *Attorney, Agent, or Firm*—Venable, LLP.; Robert Kinberg

(57) ABSTRACT

The present invention relates to a photovoltaically self-charging storage system having a layer structure in which a first material (1), which forms a first redox system, a second material (2), which forms a second redox system, and a photosensitive material (3) are arranged in or between a first (4) and a second electrically conductive layer (5). At least one of the electrically conductive layers (4, 5) is transparent for visible light. The first and the second material (1, 2) are each in electrical contact with one of the electrically conductive layers (4, 5) and arranged in the layer structure in such a manner that, due to the effect of light, the photosensitive material (3) induces a redox reaction $A_{ox}+B_{red} \rightarrow A_{red}+B_{ox}$, which can be reversed if light ceases. The thickness of the layer over which the first (1) and/or second material (2) extends is configured in such a manner that a charge storage sufficient for operating an electrical consumer is made possible. The additional introduction of a catalyst material accelerating said back reaction enables the spatial separation of the direct reaction and the back reaction. The inventive system enables the photovoltaic conversion and charge storage using a simple layer structure in an advantageous manner.

18 Claims, 1 Drawing Sheet

OTHER PUBLICATIONS

Bechinger C et al., "Photoelectrochromic Windows and Displays", Nature, GB, Macmillan Journals Ltd. London, vol. 383, No. 6601, Oct. 17, 1996, pp. 608–610 XP002064353.

Yebka B et al., "Electrochemical Lit Insertion in WO3–xTiO2 mixed oxides", Solid State Ionics, NL, North Holland Pub., vol. 104, No. 3–4, Dec. 11, 1997, pp. 169–175, XP004126227.

Anders Hagfeldt et al., "Verification of high efficiencies for the Grätzel–cell. A 7% efficient solar cell based on dye–sensitized colloidal TiO2 films", Solar Energy Materials and Solar Cells 31, 1994, pp. 481–488.

* cited by examiner

PHOTOVOLTAICALLY SELF-CHARGING STORAGE SYSTEM

FIELD OF THE INVENTION

The present invention relates to a photovoltaically self-charging storage system having a layer structure in which a first material, which forms a first redox system, a second material, which forms a second redox system, and a photosensitive material are arranged in or between a first and a second electrically conductive layer. This system is a multi-layer system which stores electric energy electrochemically when illumuniated and can release electric energy at a later time to operate an electrical consumer.

BACKGROUND OF THE INVENTION

For the mentioned application of operating an electrical consumer, the state of the art presently provides photovoltaic systems which release the required energy directly to the consumer. If the energy is not needed until later, these systems require an additional battery for storage.

Furthermore, DE 29 24 079 discloses an arrangement in which a p-n junction is employed in conjunction with a solid electrolyte to generate a charge and to store it. Such type systems, however, have the disadvantage that they are relatively complicated in structure and the selection of material is greatly limited.

SUMMARY OF THE INVENTION

The object of the present invention is to provide a photovoltaic self-charging storage system which is of simple construction and permits storing the energy provided for the operation of an electrical consumer photovoltaically.

This object is solved with the photovoltaic self-charging storage system of the valid claim 1. Advantageous embodiments and further developments of this system are the subject matter of the subclaims.

A key element of the present invention is that the photovoltaically self-charging storage system has a layer structure, in which a first material, which forms a first redox system $A_{ox}/A_{red}$, a second material, which forms a second redox system $B_{ox}/B_{red}$, and a photosensitive material are arranged in or between a first and a second electrically conductive layer, with at least one of the electrically conductive layers being transparent for visible light. The first and the second material are each in electrical contact with one of the electrically conductive layers. Furthermore, the first material, the second material and the photosensitive material are selected and arranged in the layer structure in such a manner that, due to the effect of light, the photosensitive material releases electrons to the first redox system and picks them up again from the second redox system, thereby inducing a redox reaction $A_{ox}+B_{red}\rightarrow A_{red}+B_{ox}$ (direct reaction), which can be reversed (back reaction) if light ceases, and with the back reaction being substantially slower than the direct reaction. Someone skilled in the art is familiar with combinations of materials suited for this purpose. The thickness of the layer over which the first and/or second material extends is configured in such a manner that a charge storage in the layer structure yielded by the direct reaction and in its capacity sufficient for operating an electrical consumer is made possible.

The invented storage system combines, in an advantageous manner, in a layer structure, a photovoltaic element with an electrochemical storage. A photosensitive material, preferably a coloring matter and two redox pairs $A_{ox}$, $A_{red}$ and $B_{ox}$, $B_{red}$ are combined in a suited manner and arranged between two electrically conductive layers. One of the materials can, of course, also itself form the electrically conductive layer respectively be embedded in the electrically conductive layer. Charging the storage system occurs by means of the reaction $A_{ox}+B_{red}\rightarrow A_{red}+B_{ox}$ initiated by the photosensitive material (for example: coloring matter) under light. The coloring matter (F) is excited by the light and can release an electron $e^-$ directly or via a semiconductor to $A_{ox}$, leading to a reduction of $A_{ox}$. For charge compensation of the coloring matter, the latter picks up an electron from $B_{red}$ (directly or indirectly) and thereby oxidizes $B_{red}$. These processes can be expressed by the following formulae:

$$F + \text{photon} \rightarrow F^* \text{(excitation coloring matter)} \qquad (1)$$

$$F^* + A \rightarrow F^+ \text{(rapid injection of } e^- \text{ from coloring matter to A; oxidation of A)} \qquad (2)$$

$$F^+ + B \rightarrow F + B^+ \text{(injection of } e^{31} \text{ from B to the coloring matter; reduction of B)} \qquad (3)$$

The function principle of the storage system is that the photosensitive material injects under light energetically excited charge carriers directly or indirectly via another material (see, e.g. claim 4) into the redox pair A and leads to a redox reaction there. In the case of the electron injection, A is reduced. From redox pair B, the photosensitive material receives a charge carrier again. In the case of electron injection, B is oxidized.

Depending on the layer structure respectively the layer sequence (see, e.g. claims 6, 9 and 13), $A_{red}$ and $B_{ox}$ can, for example—in the case of electron injection by means of the photosensitive material—lie directly adjacent and form an electrochemical double layer or a counter ion to one of the components of a redox pair passes over to the other and in this way compensates the charge transfer by means of the photosensitive material. In the latter case, intermediate layers possibly present between the redox pairs have to be permeable for the counter ion.

Besides this direct reaction, in redox reactions, the back reaction constantly occurs simultaneously. However, it should be greatly checked by the selection of materials. For functioning of the invented system as a storage system, a slow back reaction rate is required in the region in which the direct reaction occurs. Someone skilled in the art knows numerous materials which possess these properties. For example, a combination of $WO_3$ or $TiO_2$ as the first redox system combined with inorganic ruthenium compounds as photosensitive material and with LiI in propylene carbonate as the second redox system demonstrates a very slow back reaction rate.

The back reaction is a prerequisite for the discharge of the system. A slow back reaction permits operation of only a consumer with very low current requirements. Suited external circuitry of the system combined with a suited layer structure, as will be described in more detail in the following, can result in spatial separation between the direct reaction and the back reaction. If a catalyst material is provided at the site of the back reaction for the back reaction in the layer structure, the back reaction can be substantially accelerated depending on the external circuitry and thus supply greater current strengths. Even tiny additives of platinum act as a catalyst on the back reaction of the just described redox systems.

Functioning of the invented storage system requires that the layer thickness, over which the first or the second redox system extends, is great enough to be able to store sufficient amount of charge for the operation of an electrical consumer. Preferably layer thicknesses of 0.01 to 1 mm or more are employed.

Thus, with the photovoltaic storage system according to claim 1, the light energy is photovoltaically converted and stored in a simple layer structure to operate an electrical consumer immediately with the energy or at some later time. Besides the simple structure, this system has the further great advantage over the state-of-the art systems that, an additional battery is no longer needed for charge storage.

Materials like those used for coloring-matter-sensitized solar cells, electrochromic systems and electrochromic coloring-matter-sensitized solar cells can be employed for the layer structure. These systems are optical components which reversibly alter their optical or electrical properties by means of illumination or external circuitry. Such an optical component is, for example, described in "Photoelectrochromic Window and Displays", C. Bechinger et.al., Nature, Vol. 383, 17 October 1996, pp. 608 to 610. In this system, the layer structure is realized by two redox systems and a coloring matter, which is similar to the present invention. Opening or closing one of the external circuits permits retaining or reversing the coloration of an electrochromic $WO_3$ layer inside the layer structure.

The thickness of less than 1 μm of the provided layers there, however, makes charge storage for operation of an electrical consumer impossible. Substantially thicker layers would be required.

The materials employed in the present system can be arranged as a mixture or superimposition in the form of different layers in the layer structure. Further more, additional materials can be mixed into these materials or provided as an additional layer in the layer structure. Such types of additional materials, for example for improving the bonding of the photosensitive materials to the first redox system or for increasing the velocity of the back reaction, can enhance the kinetics of the processes and the stability of the system.

$TiO_2$ or $WO_3$ as $A_{ox}$, and $I_3^-$ and $I^-$ as $B_{ox}$ and $B_{red}$ can be given as examples of materials which form the redox systems. Redox system B can, for example, be present in the form of dissolved LiI and $I_2$ in an acetonitrile layer. The photosensitive materials are, for example coloring matters like those utilized in coloring-matter-sensitized solar cells, e.g. inorganic ruthenium compounds, anthocyanins, chlorophylls or perylene coloring matters.

The single systems can, as previously described, be directly adjacent layers and form an electrochemical double layer.

In another embodiment, it can be provided that in the redox reaction, a counter ion to a component of a redox system can pass from the phase of this redox system to the phase of another redox system and in this manner compensate the charge transfer by the photosensitive material.

An example of this is a nanoporous $WO_3$ layer as the first redox system onto which a monolayer of an inorganic ruthenium compound is applied as the photosensitive material (coloring matter). The pores of the $WO_3$ layer are saturated by an electrolyte containing LiI and $LiI_3$ as salts (second redox system). When exposed to light the coloring matter oxidizes $I^-$ to $I_3^-$, whereas the $Li^+$ ion migrates into the $WO_3$, which contains an additional electron from the coloring matter. The second redox reaction then is $W^{(+6)}O_3 + Li^+ + e^- \rightarrow LiW^{(+5)}O_3$. In order to improve the bonding of the coloring mattering to the first redox system, the coloring matter can be applied onto an additional $TiO_2$ layer disposed on the $WO_3$.

In a preferred embodiment of the present storage system, the first material, the second material and the photosensitive material form different layers which are arranged in a layer sequence of electrically conductive layer, first material, photosensitive material, second material, optionally a catalyst layer, and a second electrically conducting layer. Optionally an intermediate layer can be provided between the first material and the photosensitive material, for example to improve the bonding between the photosensitive material and the first material. One of the materials forming the redox system possesses good conductivity, preferably of greater than 0.01 $(\Omega cm)^{-1}$; the other poor conductivity of less than $10^{-4}$ $(\Omega cm)^{-1}$. This prevents the current from flowing via an externally connected consumer, but rather internally between the two electrically conducting layers.

In a second preferred embodiment, a layer structure is provided in which a layer sequence is realized with an electrically conductive layer, optionally an intermediate layer, the photosensitive material, optionally a catalyst layer, the second material, the first material and another electrically conducting layer. In this case, too, one of the materials forming the two redox materials is electrically good conducting and the other electrically poor conducting. Preferable conductivity values have been given in connection with the preceding embodiment. Therefore in both embodiments, a spatial separation between the direct reaction and the back reaction, which permits conducting the current via an external consumer, is achieved by means of a suited layer structure.

Furthermore, materials that alter their optical or electrical properties with the charge state can be utilized as materials. These are materials like those, for example, used for coloring-matter-sensitized solar cells. In this way, the additional effects of theses known optical systems can also be utilized in the present system.

BRIEF DESCRIPTION OF THE DRAWING

The present invention is made more apparent in the following using preferred embodiments with reference to the figures showing in.

DETAILED DESCRIPTION OF THE INVENTION

Figure 1:
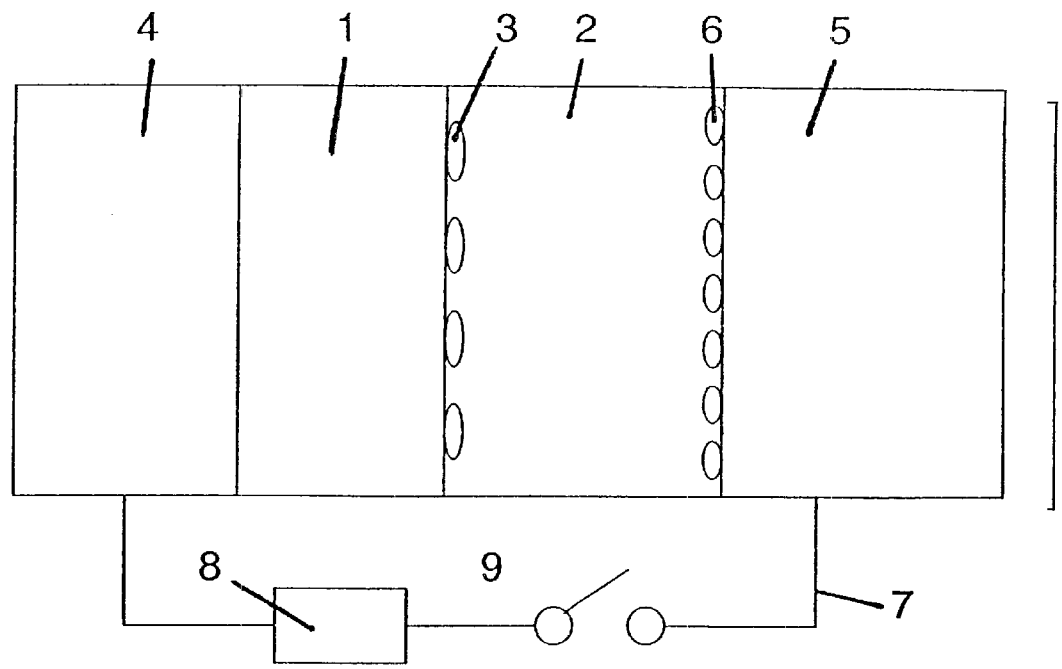
FIG. 1 a diagram of an example of a photovoltaic self-charging storage system according to a first preferred embodiment of the present invention.

FIG. 1 shows a preferred embodiment of the present storage system in which the material 1 forming the first redox pair A and the material 2 forming the second redox pair B are different layers that have direct contact to each other. In this example, the coloring matter 3 is applied directly onto the redox pair A layer. The two materials 1, 2 lie between two electrically conducting substrates 4, 5. These electrically conducting layers 4, 5 are connected via an external conductor 7, which contains both an electrical consumer 8 and a circuit element 9. A thin catalyst layer 6, at which the back reaction of the redox reaction of redox pair B can run very quickly, is provided between the layer 2 and the adjacent electrically conducting substrate 5. Redox pair A is electrically connected to this catalyst layer via the electrically conducting layers 4, 5 and the external conductor 7.

Charging the storage system occurs by means of inducing the redox reaction (direct reaction) under the effect of light with an open switch 9. Charge compensation of the coloring matter layer occurs by means of pair B at the interface layer to coloring matter 3. Due to the low electrical conductivity of layer 2 with redox pair B, the back reaction can occur only to a very small degree at the catalyst layer 6 when switch 9 is open. The charge transfer from redox pair A via the external conductor 7 and the substrate 5 into the region of layer 2 of the redox pair B influenced by the catalyst 6 cannot occur until switch 9 is closed. This corresponds to discharging the system via the electrical consumer 8, which is operated thereby.

In this case, the catalyst layer 6 and the external circuitry 7 lead to a spatial separation of the direct reaction and the back reaction permitting the advantageous use of the invented storage system to operate an electrical consumer.

In order to improve storage capability respectively the bonding of the charge carrier junction from the coloring matter into the redox pair A, an additional layer can be placed between layer 1 with the redox pair A and layer 3 with the coloring matter.

Figure 2:
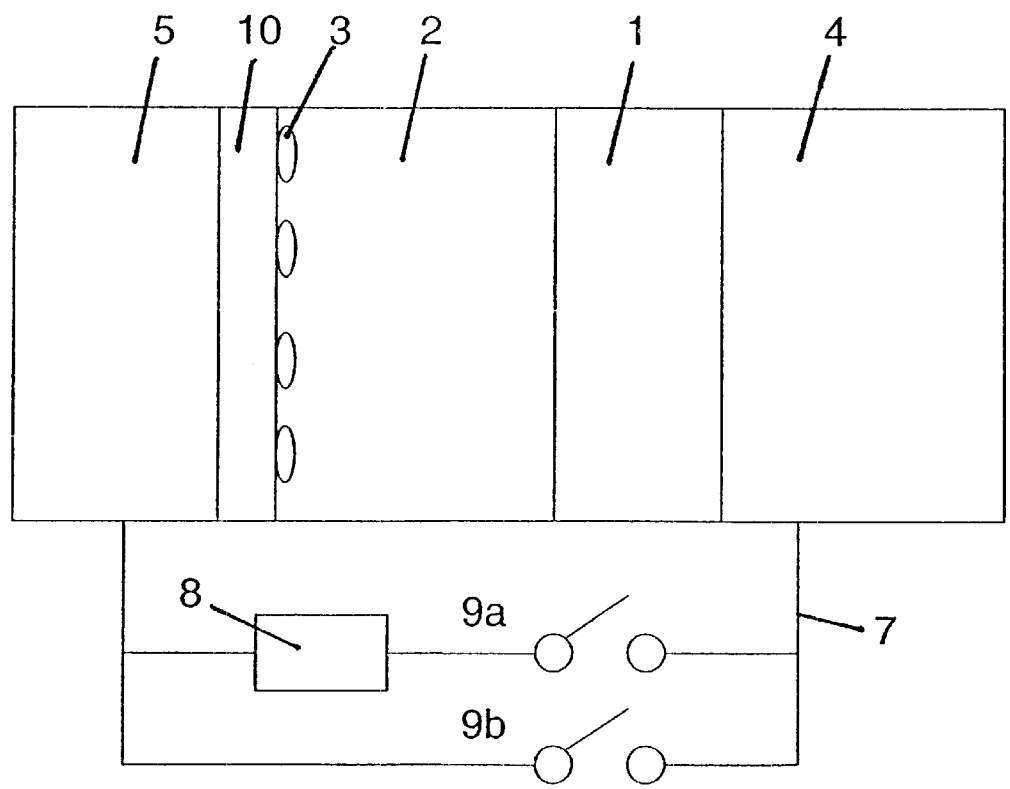
FIG. 2 a diagram of an example of a photovoltaic self-charging storage system according to a second preferred embodiment.

In a further preferred embodiment according to FIG. 2, the coloring matter 3 is not provided between the layers with the two redox pairs, but rather between layer 2 with the redox pair B and the conducting substrate 5. The intermediate layer 10, also shown in the figure, whose purpose is to improve the transfer of electrons from the coloring matter into the electrically conducting substrate and/or to enlarge the surface on which the coloring matter is placed and thus whose purpose is light absorption can also be omitted. Optionally, a catalyst for the back reaction can be provided on the coloring matter side respectively the storage side of layer 2, i.e. the side with the layer containing the redox pair A, which increases the rate of the back reaction and thus the discharge current however, also reduces the charge current. In this embodiment, there are two switches 9a, 9b provided in parallel in the external conductor 7 connecting the two conducting substrates 4, 5. Consumer 8 is connected in one of the two parallel branches of the external conductor 7. With the corresponding switch position, consumer 8 can be supplied with current under light directly without charging the battery respectively charging the storage system.

In both the described preferred embodiment variants, at least one of the two electrically conducting substrates 4, 5 must be transparent for light. One example of a suited material with this property is fluorine-doped tin on glass.

In the two preferred embodiments of the storage system shown in the figures, the two redox systems A and B are in different layers. However, another embodiment is also possible in which the two redox pairs penetrate each other. This can occur by providing a nanocrystalline $TiO_2$ layer as the first redox system A in whose pores a liquid electrolyte with LiI is introduced as the redox system B. Spatial separation of the direct reaction and the back reaction is also possible in such a type of embodiment of the storage system, in that on the respective opposite sides of the layer containing the two redox systems, on the one hand, the coloring matter and, on the other hand, a catalyst material are applied between the layer and the respective electrode. An external circuit of the two electrodes permits switching between charging and discharging the storage system.

What is special about the invented system is its electrical storage capability which permits utilization as a photovoltaic battery. The storage capability can be improved even further, in particular, by increasing the thickness of the layer of the charge-storing material. Thus the storage capability of $TiO_2$ also used in coloring-matter-sensitized solar cells can be distinctly improved by means of an adapted structure, i.e. for example by a porous, polymer structure instead of the colloidal nanocrystalline structure usual for coloring-matter-sensitized solar cells, and, compared to coloring-matter-sensitized solar cells, a substantially greater layer thickness, for example of 100 $\mu$m or more. The same, of course, also applies to other storage materials.

The storage capability of the system can be additionally increased by introducing an additional material with good ion-storing properties into the layer structure. This storing material should, furthermore, ensure that the back reaction of the redox reaction of the redox pair B is slow so that the battery does not discharge by itself in a short time. A combination of the materials $TiO_2$ and $WO_3$ is especially well-suited to meet the described requirements.

Exact dimensioning of the invented photovoltaic self-charging storage system depends on the conditions of the respective field of application. An essential factor is the electric power needed to operate the electrical consumer as well as how long the consumer is to be operated. In the following, possible dimensioning of the layer thickness of the storage material is given for an example in certain conditions.

If, for instance, the incident solar energy of one day is to be stored for the night, the required storage capacity with an assumed energy conversion efficiency of 4% and light irradiation of 400 W/m$^2$ is about 100 C./cm$^2$ with a voltage of 1V. If $WO_3$ is employed as the storing material in the layer structure, this value requires a $WO_3$ layer thickness of approximately 1 mm if storing 0.5 $Li^+$ ions per W atom ($Li_{0.5}WO_3$).

If, however, only the solar irradiation of 1 hour is to be stored, the required storage capacity decreases and the layer thickness decreases correspondingly about 10 times.

If the stored energy of one day is to be removed in one hour, this corresponds, with a charge of approximately 100 C./cm$^2$, to a current of about 10 mA/cm$^2$. With a storage system of such design, an electrical consumer can be operated for an hour with a current of about 10 mA per cm$^2$ area of the storage layer with a voltage of about 1V, respectively a power of 10 mW/cm$^2$ if the single cells are connected in series of in parallel.

The penetration resistance of the catalyst in the embodiment of FIG. 1 should, preferably be less than 10 ohm * cm$^2$ in order to prevent the drop in voltage becoming greater than 0.1 volt at the catalyst layer. This value can be readily achieved with thin layers of platinum (about 1 nm thick) as the catalyst for the redox reaction $I^- \rightleftharpoons I_3^- + 2e^-$.

The penetration resistance of the ion storage layer on the side of FIG. 1 opposite the catalyst should be greater than about 1000 ohm * cm$^2$ for the electrolytes for the redox reaction in the electrolytes. In this manner the charge losses due to own discharging via this interface should be less than a third of the overall charge. These requirements are also readily achievable with $WO_3$ or $TiO_2$ as redox systems.

In the above case of the desired discharge current of 10 mA/cm$^2$, the ion conductivity of the carrier materials of the redox pairs A and B should be about 0.01 (ohm * cm)$^{-1}$. In this manner, a maximum drop in voltage of 0.1 V is ensured via the layers. With a layer thickness of 1 mm, this corresponds to a diffusion constant of 10$^{-7}$ cm$^2$/s.

Of course, this dimensioning applies only for the particular case of storing one day's solar energy for the night (under the given conditions) and the discharge inside an hour with a current of 10 mA/cm$^2$. Naturally, there are also other applications in which the energy does not have to be stored during the whole day but rather for shorter periods, for example, for an hour or less. Electrical consumers can also be operated that require substantially less power than the described example of 10 mA/cm$^2$ with approximately 1 V respectively 10 mW/cm$^2$ if single cells are connected in series or in parallel or that should be operated for shorter or longer periods than 1 hour. For someone skilled in the art, it is no problem to adapt the described layer thicknesses to the changed requirements. The other dimensions of a preferred embodiment of the storage system are a few cm$^2$ for small consumers up to several m$^2$ for large consumers, such as e.g. homes without electricity.

Naturally, due to the use of electrochromic materials as redox pairs, the system can change the optical properties in addition to storage and release of electric energy so that it can be employed as an element with variable transmission or reflection to protect against overheating or glare or for optical storage.

What is claimed is:

1. A photovoltaically self-charging storage system with a layer structure in which a first material (1), which forms a first redox system $A_{ox}/A_{red}$, a second material (2), which forms a second redox system $B_{ox}/B_{red}$, and a photosensitive material (3) that picks up and releases electrons under illumination are arranged in or between a first electrically conducting layer (4) and a second electrically conducting layer (5), with at least one of said electrically conducting layers (4,5) being transparent for visible light, said first material (1) and said second material (2) each being in contact with one of said electrically conducting layers (4,5) respectively, said first material (1), said second material (2) and said photosensitive material being selected in such a manner that under the effect of light said photosensitive material (3) induces a redox reaction $A_{ox}+B_{red} \rightarrow A_{red}+B_{ox}$ as a direct reaction by releasing electrons to said first redox system and picking up electrons from said second redox system, which reaction can be reversed upon cessation of light in such a manner that a back reaction occurs, with said back reaction running slower than said direct reaction, wherein the layer thickness over which said first (1) and/or said second material (2) extend is selected so great that it permits a charge storage effected by said direct reaction of at least 100 mC/cm$^2$ sufficient to operate an electrical consumer (8).

2. A storage system according to claim 1, wherein said electrically conducting layers (4, 5) are connected to each other via an external, switchable electrically conducting connection (7).

3. A storage system according to claim 1, wherein the electrical contact of said first (1) and/or said second material (2) is produced with one of the electrically conducting layers (4, 5) respectively by means of a direct contact or via an electrically conductive intermediate layer (10).

4. A storage system according to claim 1, wherein said first material (1) and said second material (2) form two different layers or are embedded in two different layers.

5. A storage system according to claim 1, wherein said layer structure possesses a layer sequence's of a first electrically conducting layer (4), a first material (1), a photosensitive material (3), a second material (2) and a second electrically conducting layer (5), with said first material (1) having a relatively high electrical conductivity and said second material (2) having a relatively low electrical conductivity or vice versa.

6. A storage system according to claim 5, wherein a further layer is provided between said first material (1) and said photosensitive material (3), for better bonding of the photosensitive material.

7. A storage system according to claim 5, wherein a catalyst material (6) for said back reaction is provided between said second material (2) and said second electrically conducting layer (5).

8. A storage system according to claim 1, wherein said layer structure has a layer sequence of said second electrically conducting layer (5), said photosensitive material (3), said second material (2), said first material (1) and said first electrically conducting layer (4), with said first material (1) having a relatively high electrical conductivity and said second material (2) a relatively low electrical conductivity or vice versa.

9. A storage system according to claim 8, wherein a further layer (10) is provided between said second electrically conducting layer (5) and said photosensitive material (3).

10. A storage system according to claim 8, wherein a catalyst material for said back reaction is provided between said photosensitive material (3) and said second material (2).

11. A storage system according to claim 1, wherein said first material (1) and said second material (2) are mixed.

12. A storage system according to claim 1, wherein said first material (1) is in a porous phase and said second material (2) at least partly fills the pores of said porous phase.

13. A storage system according to claim 11, wherein a catalyst material for accelerating the back reaction is between one of said electrically conducting layers (4, 5) and the combined layer of said first material (1) and said second material (2) created by mixing with the combined layer being configured in such a manner that only said second material (2) is in contact with said catalyst material.

14. A storage system according to claim 1, wherein one component of one of the redox systems is an ion, for which there is a counter ion with an opposite charge in said layer structure and the other redox system is in a phase which permits storing said counter ion to maintain charge neutrality in said redox reaction.

15. A storage system according to claim 1, wherein said photosensitive material (3) is a coloring matter.

16. A storage system according to claim 1, wherein said layer structure contains further materials in an additional layer or as an additive to one of the layers.

17. A storage system according to claim 1, wherein one or both redox systems alter their electrical and/or optical properties in said redox reaction.

18. A storage system according to claim 17, wherein one or both redox systems are electrochromic.

* * * * *